United States Patent [19]

Kohler et al.

[11] Patent Number: 4,459,876
[45] Date of Patent: Jul. 17, 1984

[54] FLOATING PLANET GEAR SYSTEM

[75] Inventors: Ramon C. Kohler; John H. Eichorst, Jr., both of Aurora, Ill.

[73] Assignee: Caterpillar Tractor Co., Peoria, Ill.

[21] Appl. No.: 99,818

[22] PCT Filed: Sep. 4, 1979

[86] PCT No.: PCT/US79/00694

§ 371 Date: Sep. 4, 1979

§ 102(e) Date: Sep. 4, 1979

[87] PCT Pub. No.: WO81/00899

PCT Pub. Date: Apr. 2, 1981

[51] Int. Cl.³ .................. F16H 3/44; F16H 57/10; F16H 1/28

[52] U.S. Cl. .................... 74/788; 74/785; 74/801

[58] Field of Search ............ 74/785, 786, 787, 788, 74/801

[56] References Cited

U.S. PATENT DOCUMENTS

| | | | |
|---|---|---|---|
| 1,633,052 | 6/1927 | Watts | 74/785 |
| 1,799,740 | 4/1931 | Felton | 74/801 |
| 2,737,064 | 3/1956 | Stoeckicht | 74/785 |
| 2,868,037 | 1/1959 | Hindmarch | 74/785 |
| 3,015,973 | 1/1962 | Doerrtes | 74/785 X |
| 3,240,083 | 3/1966 | Stoddard | 74/786 X |
| 3,686,978 | 8/1972 | Knoblach et al. | 74/801 |
| 4,095,323 | 6/1978 | Silvesti | 74/801 X |
| 4,116,293 | 9/1978 | Fukui | 74/801 X |

FOREIGN PATENT DOCUMENTS

| | | | |
|---|---|---|---|
| 719973 | 2/1932 | France | 74/801 |
| 922895 | 6/1947 | France | 74/801 |
| 938913 | 10/1948 | France | 74/801 |
| 446842 | 3/1949 | Italy | 74/801 |
| 496731 | 8/1954 | Italy | 74/801 |
| 529679 | 1/1955 | Italy | 74/801 |
| 585343 | 11/1958 | Italy | 74/801 |
| 47-9327 | 3/1972 | Japan | 74/801 |
| 664297 | 1/1952 | United Kingdom | 74/801 |

OTHER PUBLICATIONS

"Clusters of Rollers Boost Ratios in Friction Drives", Nicholas P. Chironis, pp. 330-332.

Primary Examiner—Leslie A. Braun
Attorney, Agent, or Firm—Wood, Dalton, Phillips, Mason & Rowe

[57] ABSTRACT

A gear assembly (10) having a sun gear (11) provided with first teeth (13) and second teeth (14) axially spaced from the first set. A plurality of floating planet gears (15) are provided having first teeth (16,17) meshing respectively with sun gear teeth (13,14), and second teeth (18) meshing with a fixed outer ring gear (19). An output ring gear (20) meshes with teeth (17). A thrust washer (28) may be provided for limiting the axial movement of the planet gears.

12 Claims, 2 Drawing Figures

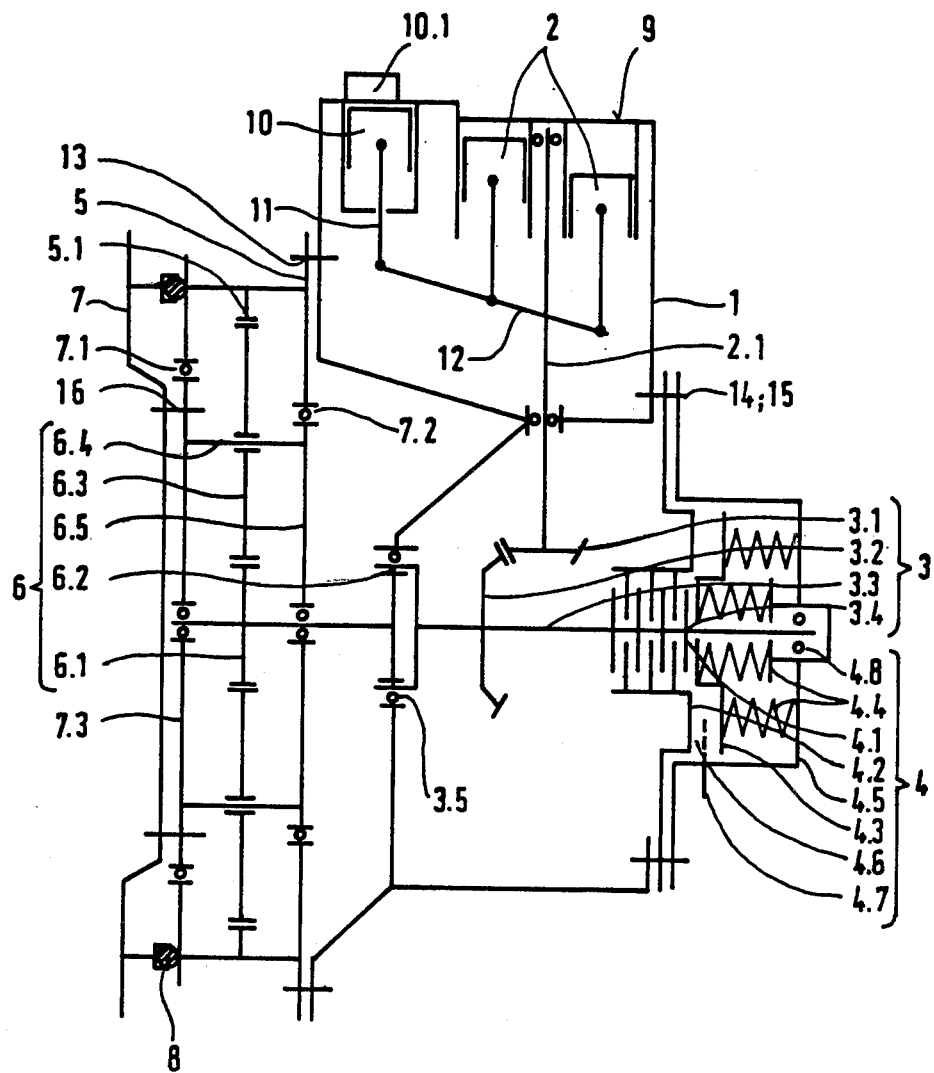

FLOATING PLANET GEAR SYSTEM

DESCRIPTION

1. Technical Field

This invention relates to gear assemblies and in particular to planetary gear systems.

2. Background Art

In the conventional planetary gear system, the planet gears are mounted to a carrier requiring the use of planet bearings.

As described by Nicholas P. Chironis in a publication entitled "Clusters of Rollers Boost Ratios in Friction Drives", a planetary roller drive is disclosed having a plurality of rows of planet rollers. In one form, the drive was arranged so that a substantial portion of the rolling surface was replaced by gear teeth with the rolling surface functioning as a bearing to keep the roller gear in its correct position in the cluster.

DISCLOSURE OF INVENTION

The present invention comprehends an improved gear assembly wherein a plurality of planet gears are arranged to float in the system eliminating the need for the planet gear carrier and bearings. The planet gears are positioned by gear mesh only in the assembly.

In the illustrated embodiment, the gear assembly includes an inner sun gear, an outer ring gear disposed coaxially of the sun gear, a plurality of planet gears having first teeth meshing with the sun gear and second teeth meshing with the ring gear, and an output ring gear meshing with the first teeth coaxially of the sun gear.

The sun gear may have axially spaced, similar sets of teeth and the planetary gears have correspondingly axially spaced sets of first teeth with the output ring gear meshing with one set only of the first teeth.

In the illustrated embodiment, the second teeth of the planet gears are disposed axially between the sets of the first teeth for engagement with the outer ring gear.

The output ring gear meshes with the planetary gear first teeth radially outwardly concentrically of the meshing of the planetary gear first teeth with the sun gear.

More specifically, the sets of planetary gear first teeth may have different axial extents.

One set of the planet gear first teeth may have an axial extent substantially equal to the axial extent of the set of second teeth.

The outer ring gear may comprise a helical gear.

Meshing teeth in the assembly may be arranged to have a partially roller contact at the pitch diameter.

A relatively large number of planet gears may be utilized, and in the illustrated embodiment, eight planet gears are utilized.

The gear assembly of the present invention is extremely simple and economical of construction while providing improved power transmission, improved load equalization, low cost manufacture, facilitated reversibility of the design, and very high reduction ratios as desired.

The gear assembly provides an increased efficiency and low maintenance.

BEST MODE FOR CARRYING OUT THE INVENTION

Figure 1:
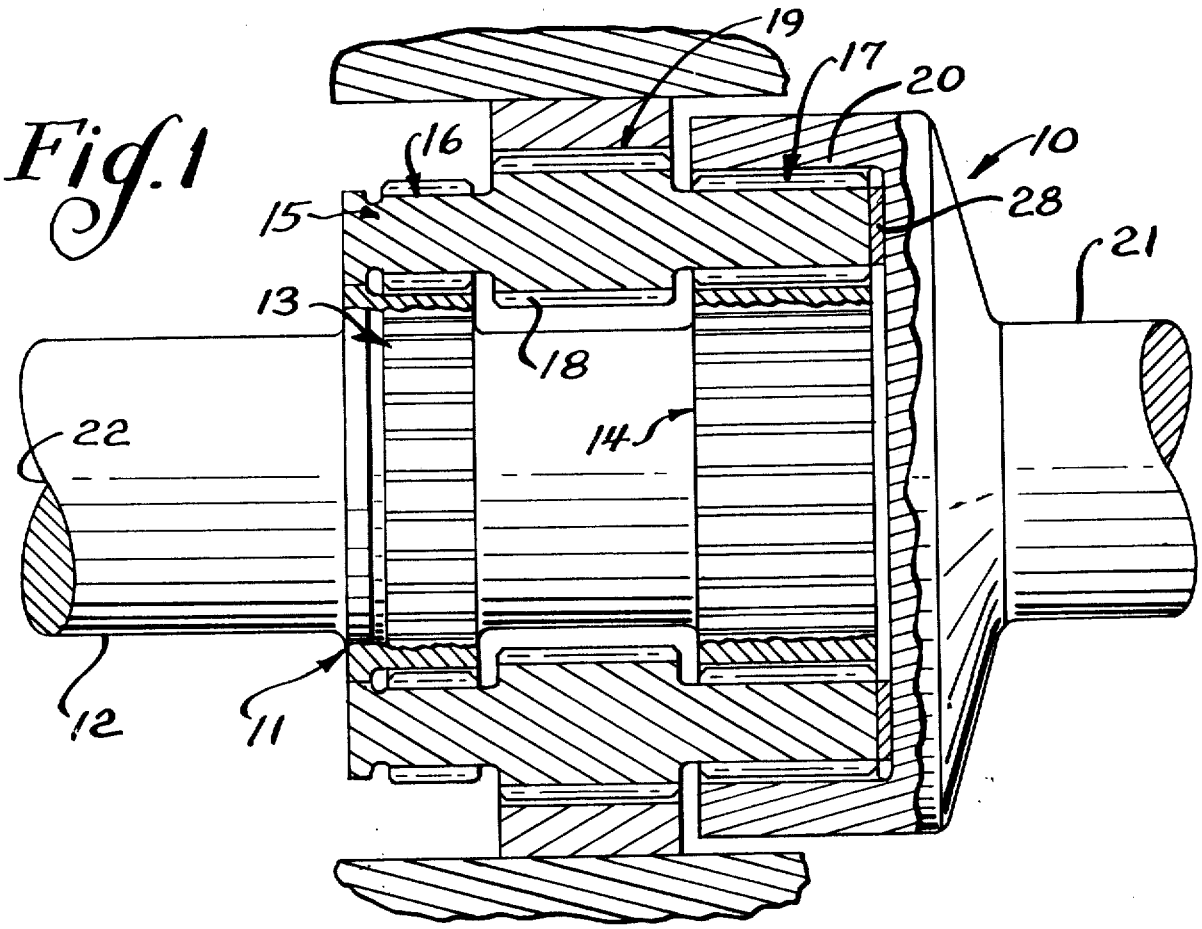
FIG. 1 is a fragmentary diametric section of a gear assembly embodying the invention.

In the exemplary embodiment of the invention as disclosed in the drawing, a gear assembly generally designated 10 is shown to include an inner sun gear generally designated 11 carried on a drive shaft 12.

As shown in FIG. 1, the sun gear may include a first set of teeth 13 and a second set of teeth 14 spaced axially from teeth 13. Teeth 14 are accurately axially aligned with teeth 13, and in the illustrated embodiment, have an axial extent approximately twice the axial extent of teeth 13.

The gear assembly further includes a plurality of planet gears each generally designated 15 having first teeth 16 and 17 which, in the illustrated embodiment, comprise axially spaced sets of teeth with a second set of teeth 18 disposed intermediate teeth set 16 and 17 and meshing with an outer ring gear 19. In the illustrated embodiment, outer ring gear 19 is fixed concentrically of shaft 12.

An output ring gear 20 meshes with planet gear teeth 17 and is mounted to an output drive shaft 21 extending coaxially of drive shaft 12.

Figure 2:
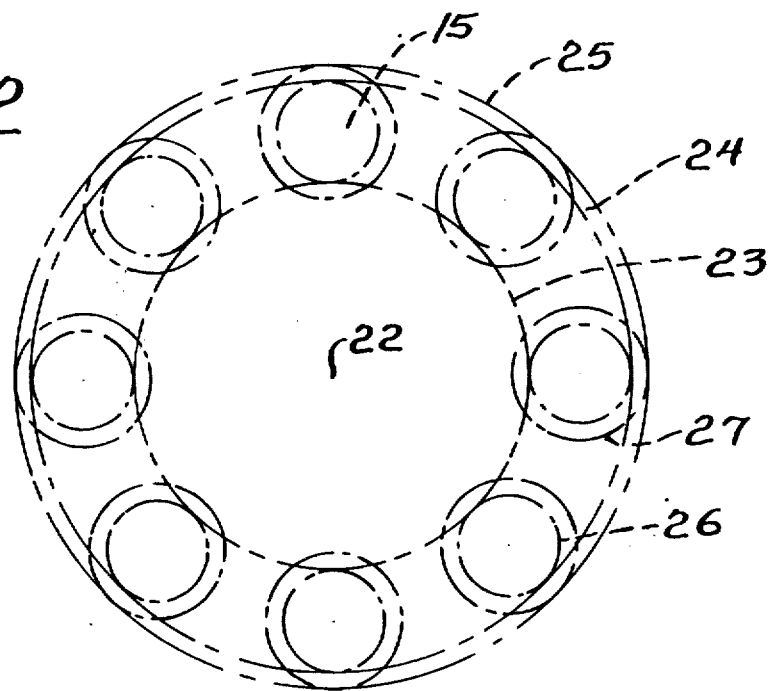
FIG. 2 is a pitch diameter detail illustration of the gear assembly.

As shown in FIG. 2, in the illustrated embodiment, eight planet gears 15 are provided equiangularly spaced about the axis 22 of shaft 12. The fixed diameters of the different gears of assembly 10 illustrated in FIG. 2 include pitch diameter 23 of the sun gear 11, pitch diameter 24 of the output ring gear 20, pitch diameter 25 of the outer ring gear 19, pitch diameter 26 of planetary gear first teeth 16 and 17, and pitch diameter 27 of planet gear second teeth 18.

Thus, briefly, the gear assembly 10 includes a sun gear having two axially spaced sets of teeth, a plurality of floating planet gears, each having three sets of teeth, an outer ring meshing with one set of teeth of the planet gears, and an output ring gear meshing with only one set of the first teeth of the planet gears.

In the illustrated embodiment, the gear teeth are shown with full gear mesh. The invention comprehends that the meshing of the teeth may be partially a roller contact at the pitch diameter to provide further improved transmission characteristics.

The invention further comprehends that teeth 18 and 19 may comprise helical teeth so as to urge the planet gears 15 axially toward the right, as seen in FIG. 1, against suitable optional thrust ring 28 for effectively maintaining the planet gears in alignment with the mating gears, as shown in FIG. 1.

The improved gear assembly 10 eliminates the need for planet carrier and carrier bearings and permits improved load equalization by eliminating bearing reaction forces on the gear teeth.

A large number of planet gears may be utilized for desired power transmission characteristics without causing positioning problems as occur in the conventional planetary gear systems using conventional carriers.

As the load may be shared by a large number of planet gears, finer pitch teeth may be utilized, permitting the manufacture of the gear assembly by roll forming or other similar low cost operations.

The improved gear assembly further permits a zero backlack assembly by providing an interference assembly of the sun, planet, and ring gears providing a substantial advantage where such zero backlash is desired.

The improved gear assembly permits facilitated design for high reduction ratios and further permits the power transmission to be readily reversible by slight modification.

In the illustrated embodiment, the two sets of teeth on the sun gear and the three sets of teeth on the planet gears are synchronized so as to effectively maintain the desired positioning of the planet gears about the sun gear.

INDUSTRIAL APPLICABILITY

The gear assembly of the present invention may have a wide range of industrial applications wherein power transmission through a planetary gear system is desirable. By making the gear assembly substantially more efficient and troublefree as compared to prior art planetary gear systems, the gear assembly of the present invention is adapted for use in a wide range of such applications.

The gear assembly of the present invention is particularly advantageously adaptable for use where high gear reductions are desirable in a small, or compact, unit.

Other aspects, objects and advantages of this invention can be obtained from a study of the drawings, the disclosure and the appended claims. The foregoing disclosure of specific embodiments is illustrative of the broad inventive concepts comprehended by the invention.

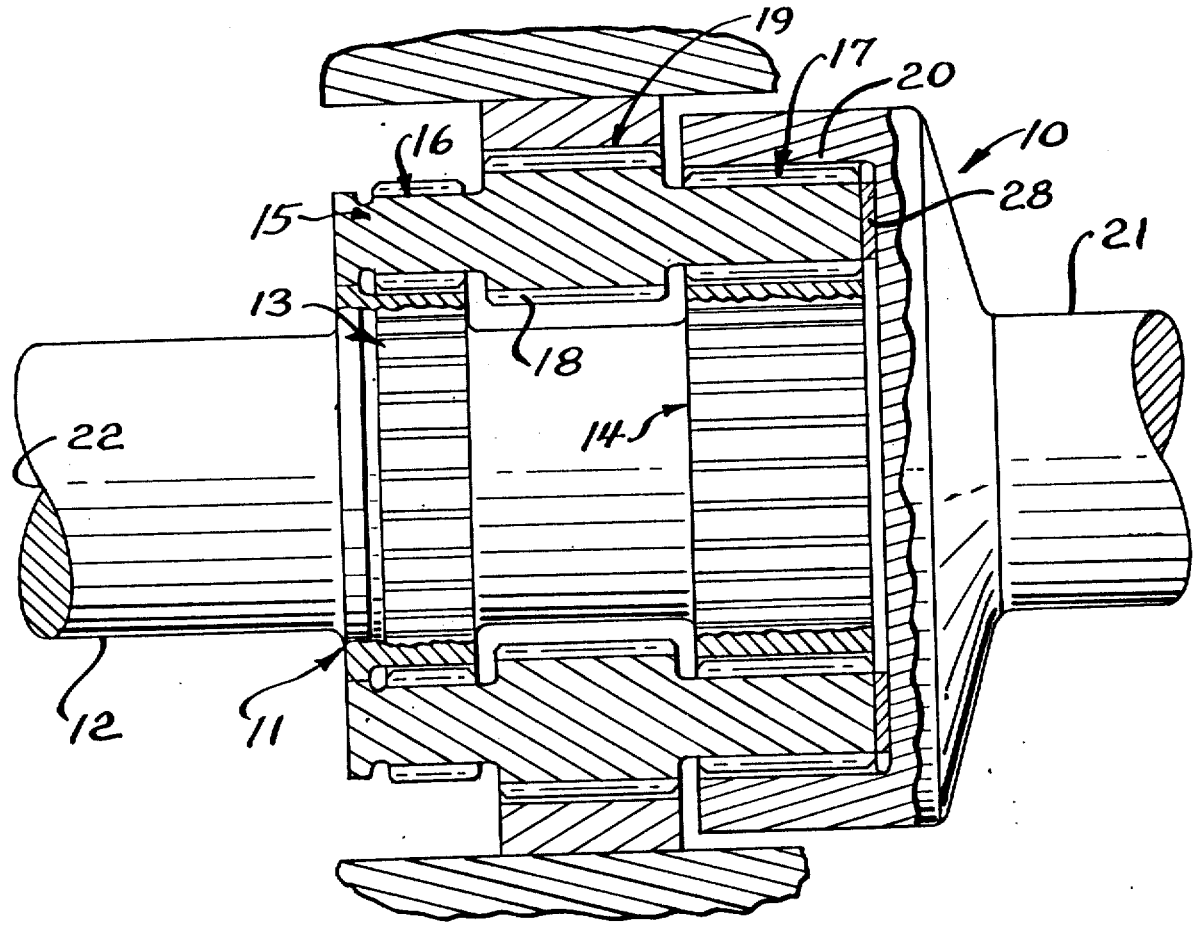

We claim:

1. A gear assembly (10) comprising:
   an inner sun gear (11);
   an outer ring gear (19) disposed coaxially of said sun gear;
   means (15) defining a plurality of coaxially aligned planet gears having first teeth (16,17) meshing with said sun gear at axially spaced positions to provide the sole radially inward support of said planet gears, and second teeth (18) meshing with said outer ring gear; and
   an output ring gear (20) meshing with said first teeth (17) coaxially of said sun gear (11).

2. The gear assembly of claim 1 wherein said sun gear (11) has axially spaced similar sets (13,14) of teeth and said planet gears have correspondingly axially spaced sets (16,17) of said first teeth, said output ring gear meshing with one set (17) only of said first teeth.

3. The gear assembly of claim 1 wherein said sun gear (11) has axially spaced similar sets (13,14) of teeth and said planet gears have correspondingly axially spaced sets (16,17) of said first teeth, said output ring gear meshing with one set (17) only of said first teeth, said second teeth (18) being disposed axially between said sets (16,17) of first teeth.

4. The gear assembly of claim 1 wherein said outer ring gear (19) is fixed.

5. The gear assembly of claim 1 wherein said output ring gear (20) meshes with said planetary gear first teeth (17) radially outwardly concentrically of the meshing (17,14) of said planet gear first teeth with said sun gear (11).

6. A gear assembly (10) comprising:
   an inner sun gear (11) having axially spaced similar sets (13,14) of teeth;
   an outer ring gear (19) disposed coaxially of said sun gear intermediate said sun gear sets (13,14) of teeth;
   means (15) defining a plurality of planet gears having coaxially spaced similar sets (16,17) of first teeth meshing with said sun gear sets (13,14) of teeth respectively to provide the sole radially inward support of said planet gears, and second teeth (18) meshing with said ring gear; and
   an output ring gear (20) meshing with one set (17) of said first teeth coaxially of said sun gear (11).

7. The gear assembly of claim 6 wherein said sets (16,17) of planet gear first teeth have different axial extents.

8. The gear assembly of claim 6 wherein said one set (17) of planet gear first teeth has an axial extent substantially equal to the axial extent of said second teeth (18).

9. The gear assembly of claim 6 wherein said outer ring gear comprises a helical gear and said second teeth (18) of the planet gears define a complementary helical gear.

10. The gear assembly of claim 6 wherein each of the teeth of said gear assembly is arranged to have a partially roller contact with the meshing gear at the pitch diameter.

11. The gear assembly of claim 6 wherein at least approximately eight planet gears (15) are provided equiangularly spaced about the axis (22) of said sun gear.

12. The gear assembly of claim 6 wherein said outer ring gear comprises a helical gear and said second teeth (18) of the planet gears define a complementary helical gear and a thrust bearing is provided at one end of the planet gear means for maintaining the planet gears in alignment with said teeth meshing therewith.

* * * * *

UNITED STATES PATENT AND TRADEMARK OFFICE
CERTIFICATE OF CORRECTION

PATENT NO. : 4,459,876

DATED : July 17, 1984

INVENTOR(S) : Ramon C. Kohler et al.

It is certified that error appears in the above-identified patent and that said Letters Patent is hereby corrected as shown below:

The title page showing the illustrative figure should be deleted to appear as per attached title page.

In the drawing the single sheet of drawing should be deleted to be replaced with one (1) sheet of drawings consisting of Figures 1 and 2.

Signed and Sealed this

Fourth Day of June 1985

[SEAL]

Attest:

DONALD J. QUIGG

Attesting Officer     Acting Commissioner of Patents and Trademarks

United States Patent [19]

Kohler et al.

[11] Patent Number: 4,459,876
[45] Date of Patent: Jul. 17, 1984

[54] FLOATING PLANET GEAR SYSTEM

[75] Inventors: Ramon C. Kohler; John H. Eichorst, Jr., both of Aurora, Ill.

[73] Assignee: Caterpillar Tractor Co., Peoria, Ill.

[21] Appl. No.: 99,818

[22] PCT Filed: Sep. 4, 1979

[86] PCT No.: PCT/US79/00694
§ 371 Date: Sep. 4, 1979
§ 102(e) Date: Sep. 4, 1979

[87] PCT Pub. No.: WO81/00899
PCT Pub. Date: Apr. 2, 1981

[51] Int. Cl.³ .................... F16H 3/44; F16H 57/10; F16H 1/28

[52] U.S. Cl. ........................ 74/788; 74/785; 74/801

[58] Field of Search ............. 74/785, 786, 787, 788, 74/801

[56] References Cited

U.S. PATENT DOCUMENTS

| 1,633,052 | 6/1927 | Watts | 74/785 |
| 1,799,740 | 4/1931 | Felton | 74/801 |
| 2,737,064 | 3/1956 | Stoeckicht | 74/785 |
| 2,868,037 | 1/1959 | Hindmarch | 74/785 |
| 3,015,973 | 1/1962 | Doerrtes | 74/785 X |
| 3,240,083 | 3/1966 | Stoddard | 74/786 X |
| 3,686,978 | 8/1972 | Knoblach et al. | 74/801 |
| 4,095,323 | 6/1978 | Silvesti | 74/801 X |
| 4,116,293 | 9/1978 | Fukui | 74/801 X |

FOREIGN PATENT DOCUMENTS

| 719973 | 2/1932 | France | 74/801 |
| 922895 | 6/1947 | France | 74/801 |
| 938913 | 10/1948 | France | 74/801 |
| 446842 | 3/1949 | Italy | 74/801 |
| 496731 | 8/1954 | Italy | 74/801 |
| 529679 | 1/1955 | Italy | 74/801 |
| 585343 | 11/1958 | Italy | 74/801 |
| 47-9327 | 3/1972 | Japan | 74/801 |
| 664297 | 1/1952 | United Kingdom | 74/801 |

OTHER PUBLICATIONS

"Clusters of Rollers Boost Ratios in Friction Drives", Nicholas P. Chironis, pp. 330-332.

Primary Examiner—Leslie A. Braun
Attorney, Agent, or Firm—Wood, Dalton, Phillips, Mason & Rowe

[57] ABSTRACT

A gear assembly (10) having a sun gear (11) provided with first teeth (13) and second teeth (14) axially spaced from the first set. A plurality of floating planet gears (15) are provided having first teeth (16,17) meshing respectively with sun gear teeth (13,14), and second teeth (18) meshing with a fixed outer ring gear (19). An output ring gear (20) meshes with teeth (17). A thrust washer (28) may be provided for limiting the axial movement of the planet gears.

12 Claims, 2 Drawing Figures